United States Patent [19]
Aoki et al.

[11] Patent Number: 5,739,849
[45] Date of Patent: Apr. 14, 1998

[54] ELECTRO-DEVELOPING RECORDING MEDIUM UPON WHICH AN IMAGE IS SENSED

[75] Inventors: Harumi Aoki; Tahei Morisawa, both of Tokyo, Japan

[73] Assignee: Asahi Kogaku Kogyo Kabushiki Kaisha, Tokyo, Japan

[21] Appl. No.: 543,326

[22] Filed: Oct. 16, 1995

[30] Foreign Application Priority Data

Oct. 14, 1994 [JP] Japan ................................. 6-275575

[51] Int. Cl.$^6$ ................................................. H04N 5/225
[52] U.S. Cl. .......................... 348/207; 348/220; 396/429
[58] Field of Search .............................. 348/207, 209, 348/210, 96, 97, 98, 112; 396/20, 429; H04N 5/225

[56] References Cited

U.S. PATENT DOCUMENTS

| | | | |
|---|---|---|---|
| 5,065,250 | 11/1991 | Takanashi et al. | 348/207 |
| 5,067,020 | 11/1991 | Funston | 348/112 |
| 5,191,408 | 3/1993 | Takanashi et al. | 348/207 |
| 5,227,885 | 7/1993 | Takanashi et al. | 348/207 |
| 5,424,156 | 6/1995 | Aoki et al. | |

FOREIGN PATENT DOCUMENTS

| | | |
|---|---|---|
| 0327236 | 8/1989 | European Pat. Off. |
| 52280 | 1/1993 | Japan |
| 524706 | 4/1993 | Japan |
| 5-150251 | 6/1993 | Japan |
| 6-313894 | 11/1994 | Japan |

*Primary Examiner*—Andrew Faile
*Assistant Examiner*—Tuan V. Ho
*Attorney, Agent, or Firm*—Greenblum & Bernstein, P.L.C.

[57] ABSTRACT

An image signal generating device has an electro-developing recording medium to electronically develop an image formed by a photographing optical system. A sub-scanning mechanism supporting a light source, a scanner optical system and a line sensor is disposed close to the electro-developing recording medium. The scanner optical system is provided on a path of a light beam which is outputted from the light source and passes through the electro-developing recording medium. The line sensor is moved on an imaging plane on which an image is formed by the scan optical system, to scan the image. The pixel signals corresponding to the image are read out from the line sensor while the line sensor scans the image.

25 Claims, 9 Drawing Sheets

ELECTRO-DEVELOPING RECORDING MEDIUM UPON WHICH AN IMAGE IS SENSED

BACKGROUND OF THE INVENTION

1. Field of the Invention

The present invention relates to a device which is provided in an electronic still video camera, for example, and which keeps a visible image corresponding to an optical image obtained through a photographing lens, and which generates an image signal in accordance with the visible image.

2. Description of the Related Art

Conventionally, silver halide photographic material is generally used as a material for recording an optical image. Silver halide photographic material has high optical sensitivity and high resolution, and the economical efficiency thereof is excellent. However, silver halide photographic material has drawbacks in that not only is the developing process cumbersome but also a visible image cannot be obtained at the same time as photography. A dry-type developing method has been developed to simplify the developing process. However, simultaneous development in which a visible image is obtained upon photography is impossible in the dry-type developing method.

On the other hand, as non-silver-halide photographic materials, there are known electrophotographic materials, diazo type photographic materials and free-radical photographic materials and so on. In these materials, however, there is no material which has advantageous characteristics like silver halide photographic material, while being able to simultaneously develop and keep a visible image. Note that, electrophotographic materials have been used mainly in copying machines, since they can perform dry-type development and can simultaneously develop an electrostatic latent image, which is obtained by exposure, using toner.

In such electrophotographic materials, recently, a photographic material has been developed in which a recording material made of the photographic material is electronically and directly developed similarly to a silver halide photographic materials, so that the developed visible image can be immediately seen or recorded. Such a recording material in which a visible image is electronically developed is referred to as an electro-developing recording material in this specification.

Japanese Unexamined Patent Publication No. 5-2280, for example, discloses a recording material which is a combination of an electrostatic information recording material and an electric charge keeping medium, the electrostatic information recording material having a photoconducting layer and an inorganic oxide material layer, and the electric charge keeping medium having a liquid crystal display. In this structure, when the electrostatic information recording material is exposed while an electric voltage is applied to the electrostatic information recording material and the electric charge keeping medium, electric charge in accordance with the amount of incident light is generated in the electrostatic information recording material. Since the intensity of electric field applied to the liquid crystal display facing the electrostatic information recording material is varied in accordance with the generated electric charge, an image corresponding to the amount of light distribution is indicated or developed on the liquid crystal display.

Japanese Unexamined Patent Publication No. 5-150251 discloses a dispersion type liquid crystal display in which an image indicated on the liquid crystal display is kept even if the electric field applied to the liquid crystal display is removed.

Nevertheless, there is no optical device, such as a camera, to which the electronic photographic material by which a visible image is simultaneously developed and recorded upon a photographing operation is applied. Therefore, it is desired to develop a device by which an image obtained by the electronic photographic material is converted to an electric signal to be outputted from the device, and which has a simple structure.

SUMMARY OF THE INVENTION

Therefore, an object of the present invention is to provide an image signal generating device by which a static image signal is generated by a simple structure and a high definition image signal is easily obtained.

According to the present invention, there is provided an image signal generating device comprising, a first optical system, an electro-developing recording medium, a light source, a second optical system, a sensor, a sub-scanning mechanism, and reading out means.

The electro-developing recording medium electronically develops an image formed by the first optical system. The light source illuminates the electro-developing recording medium. The second optical system is disposed on an optical path of a light beam which is generated by illuminating the electro-developing recording medium. The sensor can be moved in an imaging plane on which an image is formed by the second optical system, and generates a pixel signal in accordance with the image. The sub-scanning mechanism moves the sensor on the imaging plane to sense the image. The reading out means reads out the pixel signal from the sensor.

Further, according to the present invention, there is provided an image signal generating device comprising a first optical system, an electro-developing recording medium, a light source, a second optical system and a line sensor.

The electro-developing recording medium electronically develops an image formed by the first optical system. The light source illuminates the electro-developing recording medium. The second optical system is disposed on an optical path of a light beam passing through the electro-developing recording medium. The line sensor moves in an imaging plane on which an image is formed by the second optical system and outputs a pixel signal in accordance with the image.

Furthermore, according to the present invention, there is provided a camera in which an electro-developing recording medium is mounted, the camera comprising a photographing optical system for forming an object image onto the electro-developing recording medium, exposure control means, developing control means and first command means.

The exposure control means controls an exposure of the electro-developing recording medium. The developing control means outputs a recording medium activating signal by which the object image is developed in the electro-developing recording medium. The first command means commands start of operations of the exposure control means and the developing control means.

Further, according to the present invention, there is provided a camera comprising an electro-developing recording medium, an photographing optical system, photoelectric conversion means, a reading optical system and image signal generating means.

The photographing optical system is provided for forming an optical image onto the electro-developing recording medium. The photoelectric conversion means photoelectric-converts an optical image signal to an electronic signal and outputting the electronic signal. The reading optical system forms the optical image formed on the electro-developing recording medium onto a light receiving surface of the photoelectric conversion means. The image signal generating means generates an image signal corresponding to the optical image formed on the electro-developing recording medium based on the electronic signal outputted from the photoelectric conversion means.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
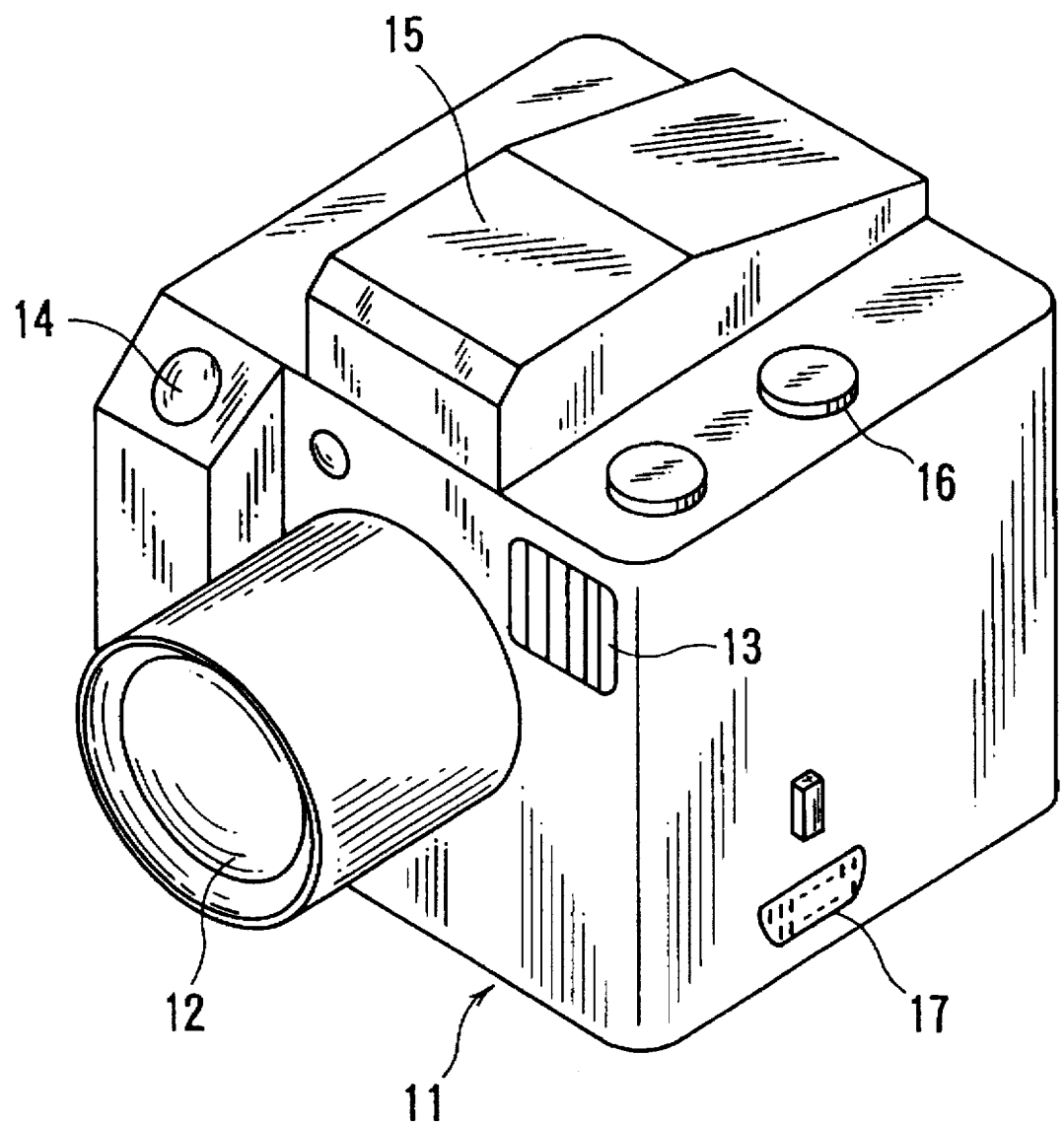
FIG. 1 is an external view showing a still video camera to which an image signal generating device of an embodiment according to the present invention is applied.

FIG. 1 is an external view of a still video camera to which an image signal generating device of an embodiment according to the present invention is applied.

When viewing a camera body 11 from a front side, on a front surface of the camera body 11, a photographing optical system 12 including a photographing lens system and so on is provided on approximately the central portion of the front surface, and an electronic flash 13 is disposed on a portion to the right of and above the photographing optical system 12. A release switch 14 is provided on the side opposite to the electronic flash 13. On the upper surface of the camera body 11, a view finder 15 is provided at the center portion thereof, and operation switches, including a scan start switch 16, are provided on a side of the view finder 15. On a side surface of the camera body 11, an output terminal 17 is formed on a lower portion thereof so that an image signal obtained by this camera is outputted to an external recording device.

Figure 2:
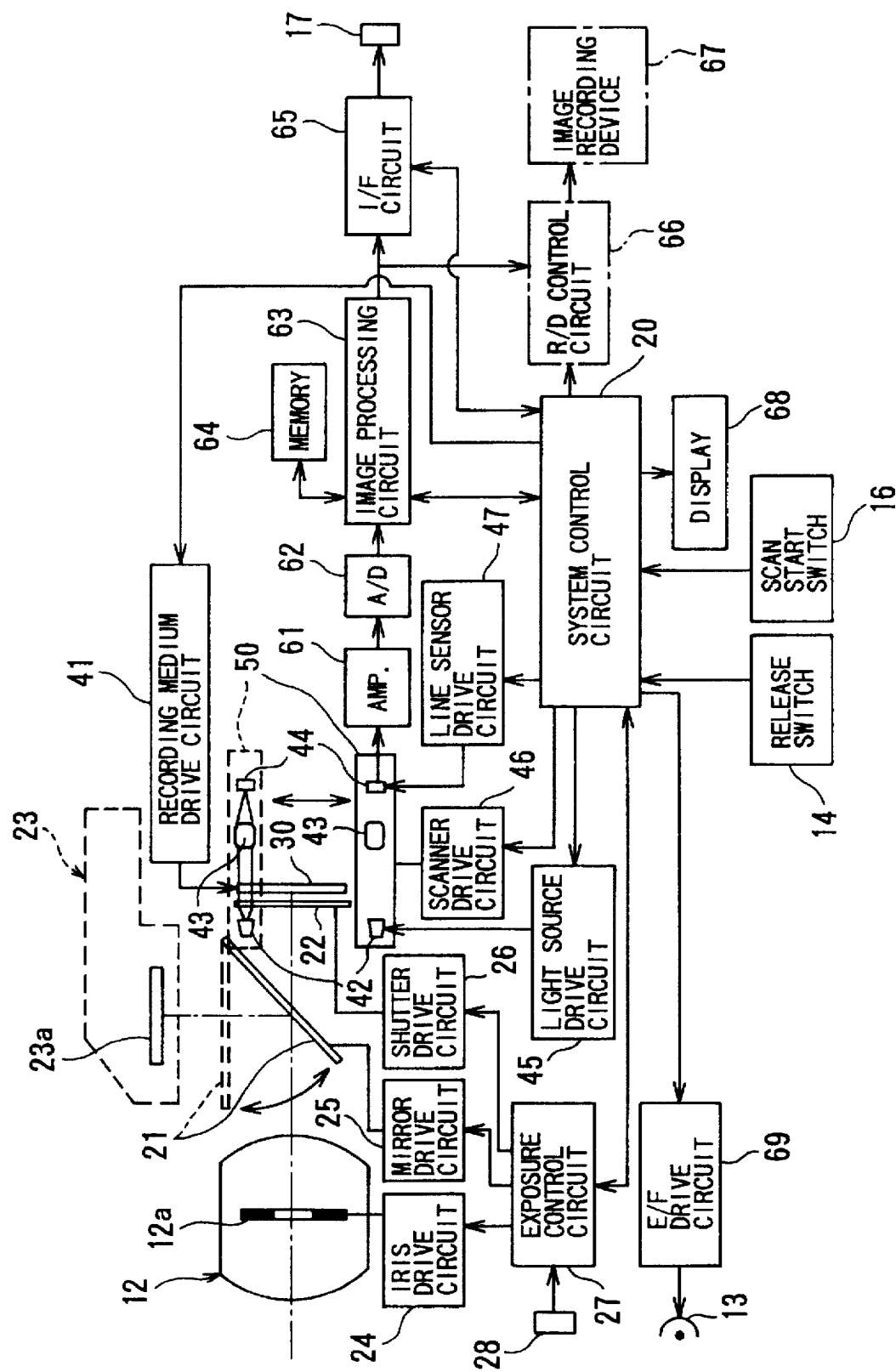
FIG. 2 is a block diagram of the still video camera of FIG. 1.

FIG. 2 is a block diagram of the still video camera, in which a system control circuit 20 including a microcomputer is mounted to control the still video camera as a whole.

The photographing optical system 12 has a plurality of lens groups and an aperture 12a. An electro-developing recording medium 30 is disposed behind the photographing optical system 12, and a quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The aperture 12a, the quick return mirror 21 and the shutter 22 are driven by an iris drive circuit 24, a mirror drive circuit 25 and a shutter drive circuit 26, respectively, which are controlled by an exposure control circuit 27.

The exposure control circuit 27 is operated in accordance with a command signal outputted by the system control circuit 20. Namely, when an exposure is controlled, the opening degree of the aperture 12a is adjusted by the iris drive circuit 24 under control of the exposure control circuit 27 based on an output signal of a photometry sensor 28.

The quick return mirror 21 is usually set to a down position (an inclining position shown by the solid line in the drawing), so that a light beam passing through the photographing optical system 12 is led to the view-finder optical system 23 so that an object to be photographed can be observed by the photographer. When a photographing operation is carried out, the quick return mirror 21 is rotated upward by the mirror drive circuit 25 and set to an up position (a horizontal position shown by the broken line in the drawing), so that the light beam is led to the electro-developing recording medium 30.

The shutter 22 is usually closed, and upon a photographing operation, the shutter 22 is opened for a predetermined period by the shutter drive circuit 26 under the control of the exposure control circuit 27. Thus the light beam passing through the photographing optical system 12 enters a light receiving surface of the electro-developing recording medium 30, forming a two dimensional image thereon.

An electric voltage is applied to the electro-developing recording medium 30 under the control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the system control circuit 20.

A sub-scanning mechanism 50 is provided close to the electro-developing recording medium 30. A light source 42 includes an LED (light emitting diode) and a collimator lens, and emits a parallel light beam. The light source 42, a scanner optical system 43 and a line sensor 44 are supported by the sub-scanning mechanism 50, and are moved along the electro-developing recording material 30 by a sub-scanning operation of the sub-scanning mechanism 50.

The line sensor 44 may be a one dimensional CCD sensor of 2000 pixels, for example. The line sensor 44 serves as a photoelectric-conversion device, which converts an optical image to an electric signal. The light source 42 can be moved along the front surface of the shutter 22 or the front surface of the electro-developing recording medium 30, and the line sensor 44 can be moved along the rear surface of the electro-developing recording medium 30. The scanner optical system 43 is disposed between the light source 42 and the line sensor 44. When sub-scanning is carried out by the sub-scanning mechanism 50, the scanner optical system 43 is positioned between the electro-developing recording medium 30 and the line sensor 44, so that the image developed by the electro-developing recording medium 30 is illuminated by the light source 42 and formed on the light receiving surface of the line sensor 44 due to an operation of the scanner optical system 43. Namely, the scanner optical system 43 is disposed on the optical path of the light beam which passes through the electro-developing recording medium 30, and the line sensor 44 is moved in an imaging plane, on which an image is formed, by the sub-scanning optical system 43.

ON and OFF control of the light source 42 is performed by a light source drive circuit 45. Control of the reading operation of the pixel signal generated in the line sensor 44 is carried out by a line sensor drive circuit 47. Control of the movement of the sub-scanning mechanism 50 is performed by a scanner drive circuit 46. The circuits 45, 46 and 47 are controlled by the system control circuit 20.

A pixel signal read out from the line sensor 44 is amplified by an amplifier 61, and converted to a digital signal by an A/D converter 62. The digital pixel signal is subjected to a shading correction, a dropout correction, a gamma correction and so on by an image processing circuit 63 under control of the system control circuit 20, and then, is temporarily stored in a memory 64. The memory includes an EEPROM in which correction data for the shading correction is stored. Note that the memory 64 may have a storage capacity equal to one horizontal scanning line outputted from the line sensor 44, or may have a storage capacity of one frame's worth of image signals.

The pixel signal outputted from the memory 64 is inputted to an interface circuit 65 through the image process circuit 63, so that the pixel signal is subjected to a predetermined process, such as a format conversion, and can be outputted to an external display device (not shown) through the output terminal 17. The pixel signal outputted from the image process circuit 63 is subjected to a predetermined process, such as an image compression and a format conversion in a recording device control circuit 66, so that the pixel signal can be recorded on a recording medium, such as an IC memory card, for example, in an image recording device 67. The interface circuit 65 and the recording device control circuit 66 are operated in accordance with a command signal outputted from the system control circuit 20.

The release switch 14 and the scan start switch 16 are connected to the system control circuit 20, and an operation, such as a photography operation, a reading operation and so on are carried out in accordance with an operation of the switches 14 or 16. A display device 68 for indicating various setting conditions of the still video camera, and an electronic flash drive circuit 69 for performing a flash control of the electronic flash 13 are also connected to the system control circuit 20.

Figure 3:
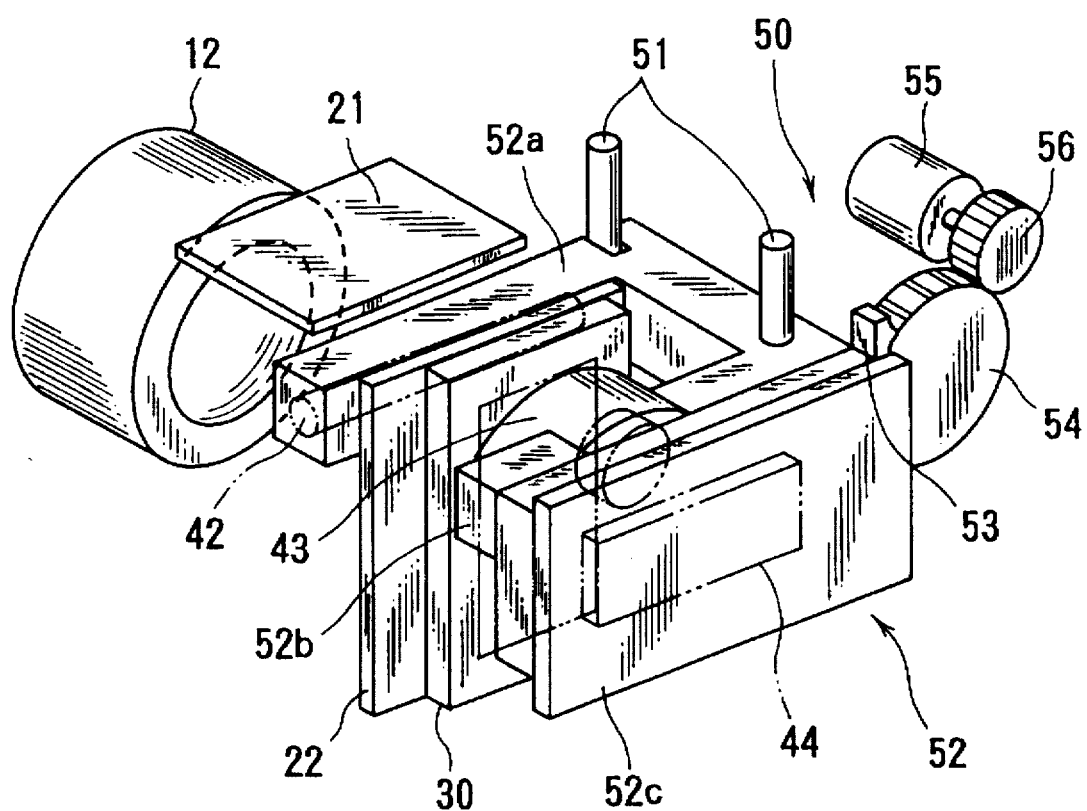
FIG. 3 is a perspective view showing a sub-scanning mechanism and members provided around the mechanism employed in the embodiment of FIG. 1.

FIG. 3 shows the structure of the sub-scanning mechanism 50 and members provided around the mechanism 50.

The sub-scanning mechanism 50 has a moving member 52 which is slidably supported by a pair of guide shafts 51 and has first and second leg portions 52a and 52b and a support portion 52c. The first leg portion 52a extends between the quick return mirror 21 and the shutter 22, and the second leg portion 52b extends behind the electro-developing recording medium 30. The support portion 52c is provided behind the second leg portion 52b. The light source 42, the scanner optical system 43 and the line sensor 44 are attached to the first leg portion 52a, the second leg portion 52b and the support portion 52c, respectively. The light source 42 and the line sensor 44 are extended in horizontal directions, respectively. A rack 53 fixed to the moving member 52 is meshed with a pinion 54 which is meshed with a gear 56 provided on an output shaft of a scan drive motor 55.

In an operation other than a photographing operation, or when reading out of an image from the electro-developing recording medium 30 is not performed, the moving member 52 is positioned offset from a path between the photographing optical system 12 and the electro-developing recording medium 30, the position being below the electro-developing recording medium 30, for example. When a photographing operation has been completed and an image has been developed in the electro-developing recording medium 30, the scan drive motor 55 is operated, the moving member 52 is moved upward so that a sub-scan of the line sensor 44 is carried out, and the line sensor 44 is moved in a direction perpendicular to the longitudinal direction (i.e., a main scanning direction) of the line sensor 44. Note that the line sensor 44 is not necessarily moved only in a perpendicular direction, but may be moved in any direction different from the longitudinal direction.

Figure 4:
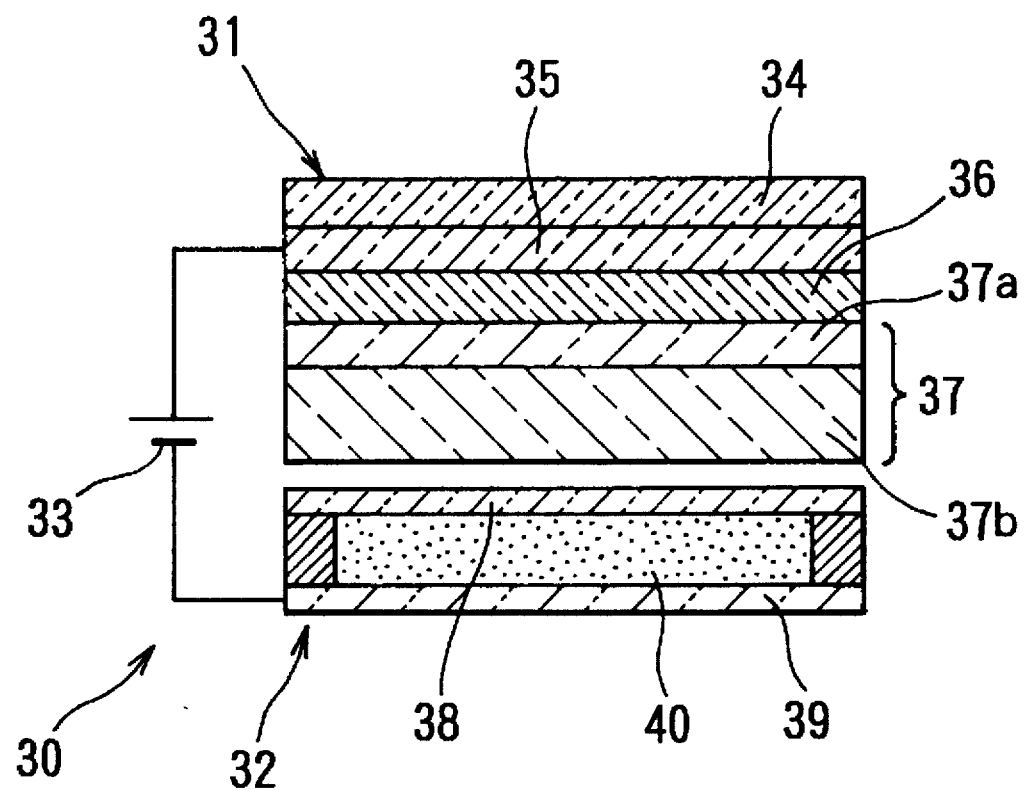
FIG. 4 is a view showing a structure of an electro-developing recording medium.

FIG. 4 shows a structure of the electro-developing recording medium 30, and is the same as that shown in Japanese Unexamined Patent Publication No. 5-2280.

The electro-developing recording medium 30 has an electrostatic information recording medium 31 and an electric charge keeping medium 32, and an electric voltage is applied thereto by a power source 33. The electric power source 33 corresponds to the recording medium drive circuit 41, so that an ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36 and a photoconducting layer 37. The photoconducting layer 37 is formed by laminating an electric charge generating layer 37a and an electric charge transferring layer 37b. The electric charge keeping medium 32 is formed by confining liquid crystal 40 between a liquid crystal supporting plate 38 and a liquid crystal electrode layer 39. The electric charge transferring layer 37b of the photoconducting layer 37 and the liquid crystal supporting plate 38 of the electric charge keeping medium 32 face each other with a small gap therebetween.

When the electric power source 33 is turned ON, an electric voltage is applied between the electrode layer 35 and the liquid crystal electrode layer 39, i.e., between the electrostatic information recording medium 31 and the electric charge keeping medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is indicated on the liquid crystal display 40 as a visible image, and thus, an image of an object is developed. Namely, the visible image is generated in accordance with the electric charge.

The electric charge keeping medium 32 is a dispersion type liquid crystal display, and thus, the developed visible image is kept therein even if the electric field is removed. In the dispersion type liquid crystal display, the developed visible image can be deleted by heating the dispersion type liquid crystal display, using a heating device (not shown) at a predetermined temperature. In such a case, the same electric charge keeping medium 32 can be used repeatedly.

Figure 5:
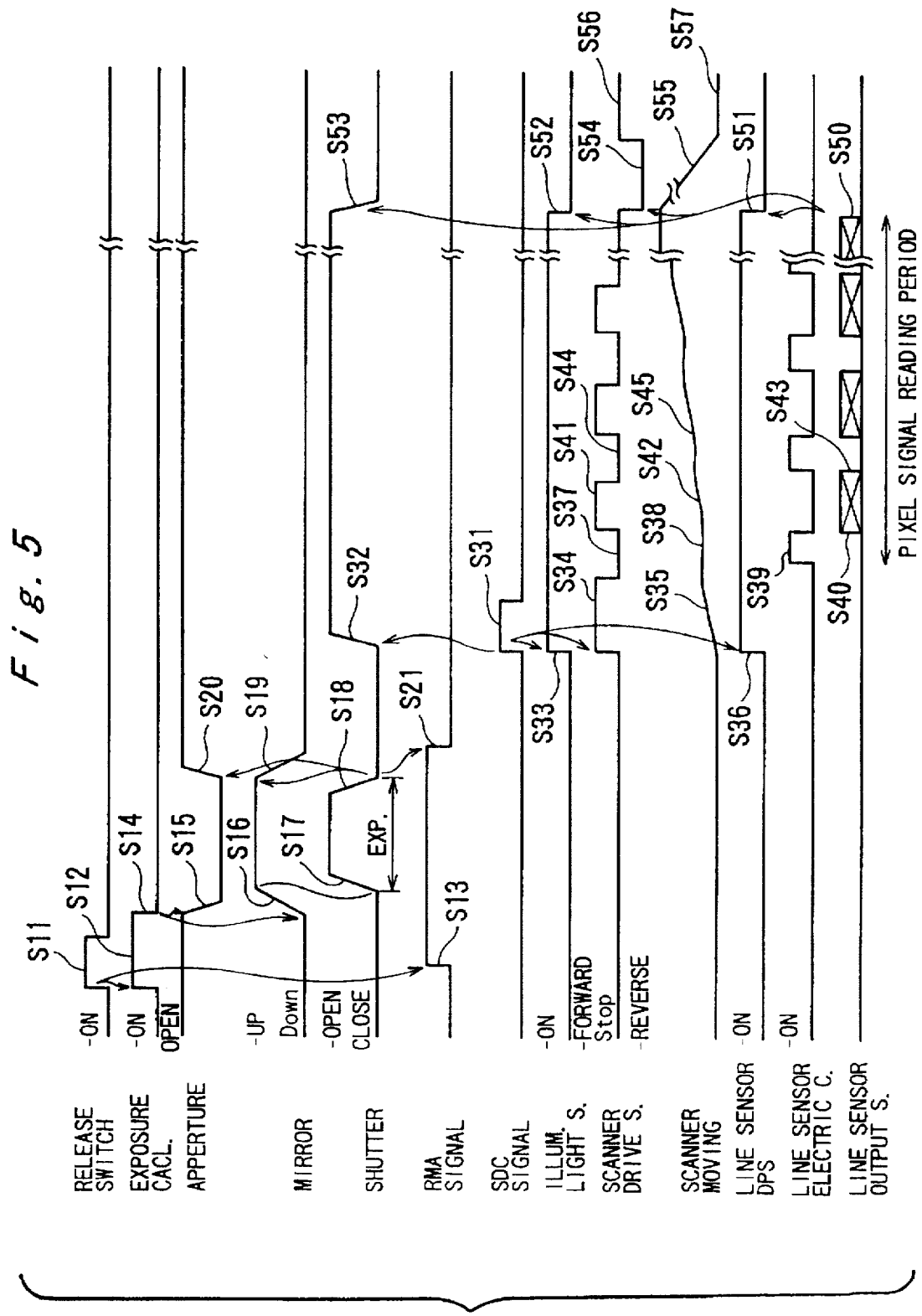
FIG. 5 is a timing chart showing a photographing operation and a reading operation of a pixel signal from a line sensor.
Figure 6:
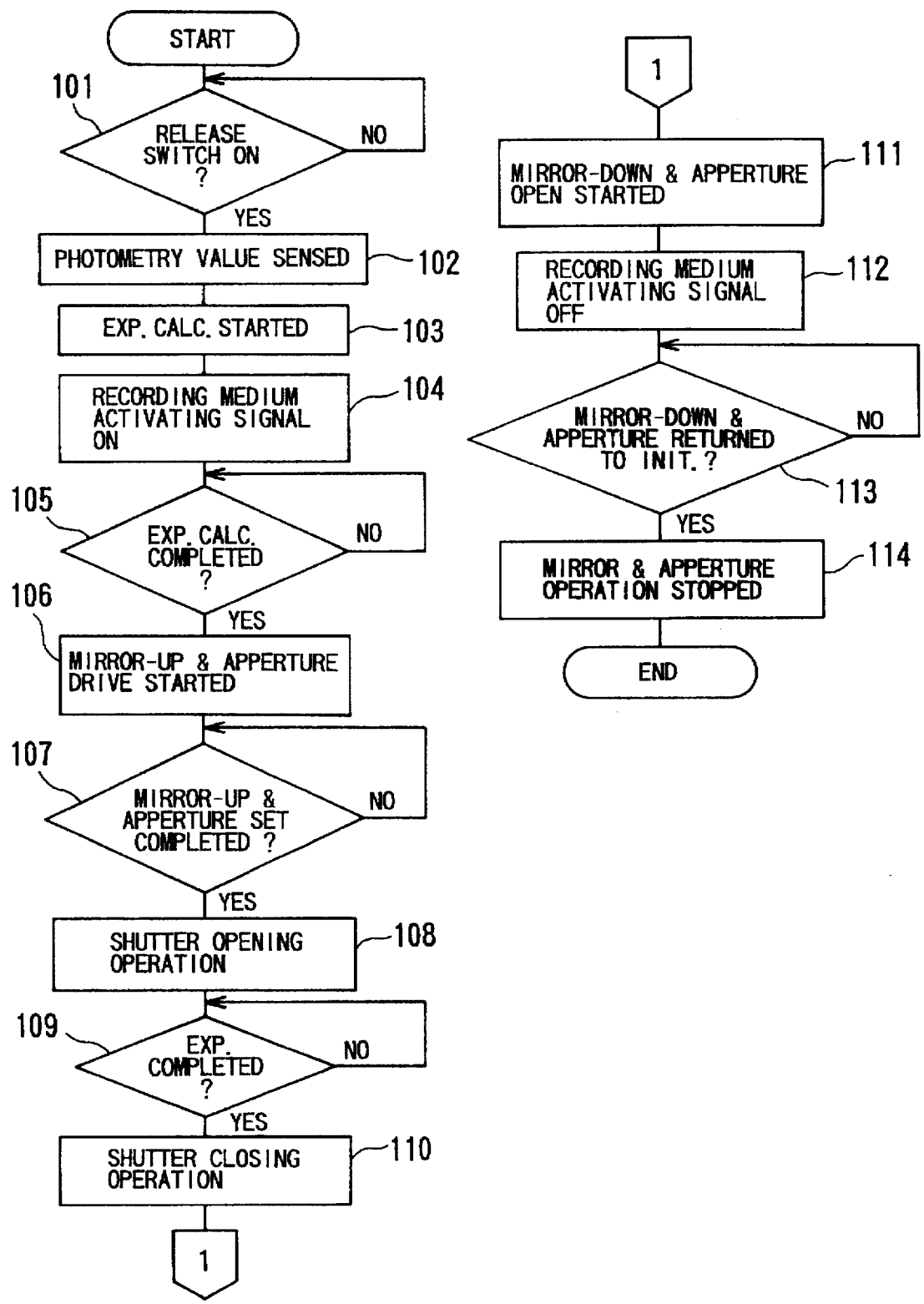
FIG. 6 is a flowchart of the photographing operation.
Figure 7:
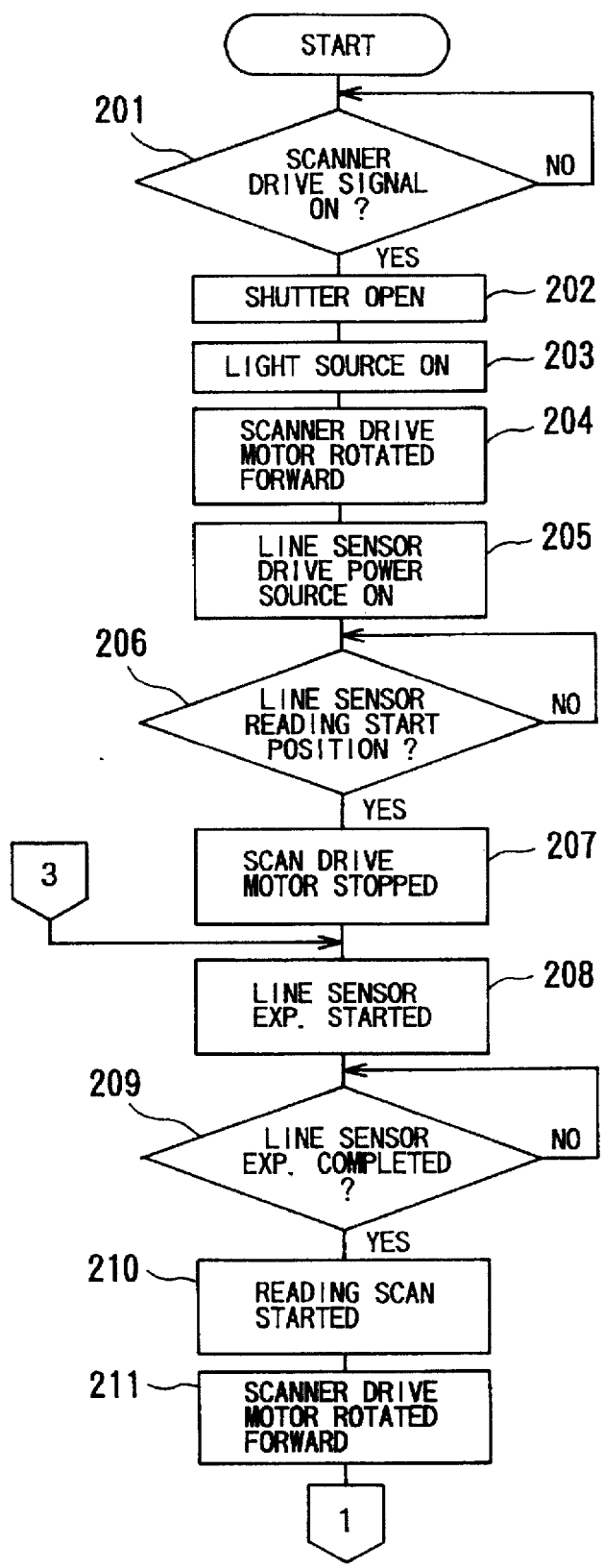
FIG. 7 is a first part of a flowchart of the reading operation of the pixel signal.
Figure 8:
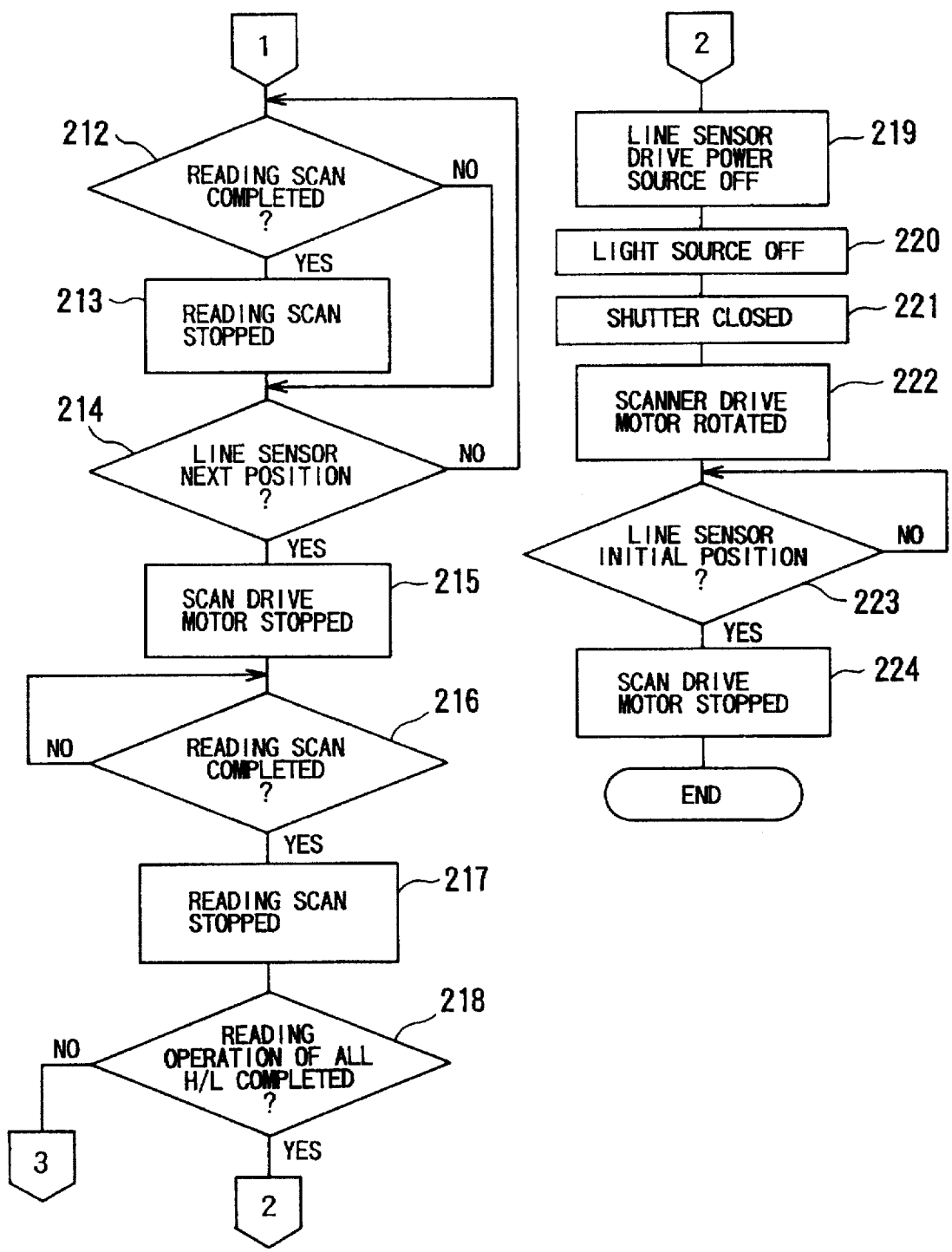
FIG. 8 is a latter part of the flowchart of the reading operation.

FIG. 5 is a timing chart showing a photographing operation and a reading operation of the pixel signal from the line sensor 44. FIG. 6 is a flowchart of the photographing operation, and FIGS. 7 and 8 are flowcharts of the reading operation of the pixel signal. With reference to these drawings, an operation of the embodiment will be described.

When it is sensed in Step 101 that the release switch 14 is depressed (reference S11), an output signal of the photometry sensor 28, (i.e., a photometry value) is sensed in Step 102. In Step 103, an exposure calculation is started based on the photometry value (reference S12). After a predetermined period has passed since the release switch 14 has been depressed, a recording medium activating signal is outputted in Step 104 (reference S13), so that the electric power source 33 is turned ON, and thus, an electric voltage is applied to the electrostatic information recording medium 31 and the electric charge keeping medium 32. When it is confirmed in Step 105 that the exposure calculation has been completed (reference S14), then, in Step 106 and the following Steps, a photographing operation is carried out in accordance with the calculation result.

In Step 106, the opening degree of the aperture 12a is changed from the fully open state to a predetermined opening degree (reference S15), and the quick return mirror 21 is changed from a down condition to an up-condition (reference S16). When it is confirmed in Step 107 that the quick return mirror 21 has been changed to the up-condition and the opening degree adjustment of the aperture 12a has been completed, the shutter is opened in Step 108 (reference S17). When, in Step 109, the exposure period determined by the exposure calculation has passed and it is sensed that the exposure has been completed, the shutter 22 is closed in Step 110 (reference S18). By the completion of the closing operation of the shutter 22, Step 111 is executed so that the quick return mirror 21 is changed to the down-condition (reference S19) and the aperture 12a is driven to the fully open condition (reference S20). In Step 112, the output of the recording medium activating signal is stopped (reference S21).

Namely, the recording medium activating signal is outputted at least for the period while the shutter 22 is opened, and during this period, a predetermined voltage is applied to the electro-developing recording medium 30. Then, by exposing the electro-developing recording medium 30 under the voltage applied condition, the object image is developed on the electro-developing recording medium 30 as a visible object image. The visible object image is kept even if the output of the recording medium activating signal is stopped.

When it is confirmed in Step 113 that the quick return mirror 21 and the apperture 12a have returned to their initial positions, the operations of the quick return mirror 21 and the apperture 12a are stopped in Step 114, and thus, this routine ends.

Note that the recording medium activating signal can be outputted immediately before the exposure is started, i.e., immediately before the shutter is opened. In this case, in the flow chart of FIG. 6, Step 104 is changed to be positioned between Steps 107 and 108.

Then, when the scan start switch 16 is depressed, a sub-scanning operation of the sub-scanning mechanism 50 is started, and the reading operation routine described below (with reference to FIGS. 7 and 8) is executed.

When it is confirmed in Step 201 that a scanner drive signal has been outputted (reference S31), the shutter 22 is opened in Step 202 (reference S32), and the light source 42 is lit in Step 203 (reference S33). Then, a scanner drive signal is outputted in Step 204 (reference S34), so that the scan drive motor 55 operates in a forward direction, and the moving member 52 of the sub-scanning mechanism 50 starts to move upward from the lowest position of the electro-developing recording medium 30 (reference S35). In Step 205, a line sensor drive power source included in the line sensor drive circuit 47 is turned ON (reference (S36).

When it is confirmed in Step 206 that the line sensor 44 is set at a reading start position, the output of the scanner drive signal is stopped in Step 207 (reference S37), and thus, the scan drive motor 55 is stopped (reference S38). This stopping operation is controlled by counting pulse signals, for example, used for rotating the scan drive motor 55.

Then, in Step 208, an exposure of the line sensor 44 is started, and thus, electric charge accumulation of the line sensor 44 is performed (reference S39). When it is confirmed in Step 209, by sensing that a constant time has passed, for example, that the exposure of the line sensor 44 has been completed, a reading scan of the line sensor 44 and an output operation of a pixel signals of one horizontal scanning line from the line sensor 44 are started in Step 210 (reference S40). In Step 211, the scanner drive signal for operating the scan drive motor 55 in a forward direction is outputted (reference S41), so that the moving member 52 starts to move upward (reference S42).

During movement of the moving member 52, when it is confirmed in Step 212 that the reading scan has been completed, the reading scan is stopped in Step 213 (reference S43). Note that the completion of the reading scan is controlled by counting pulse signals, for example, which are outputted from the line sensor drive circuit 47 to drive the line sensor 44. When the completion of the reading scan is not confirmed in Step 212, Step 213 is skipped and Step 214 is executed, so that it is determined whether the line sensor 44 has been set at the position of the next horizontal scanning line, i.e., the next reading position. When the line sensor 44 has not been set at the position of the next horizontal scanning line, Steps 212 through 214 are executed again.

When it is confirmed in Step 214 that the line sensor 44 has been set at the position of the next horizontal scanning line, the output of the scanner drive signal is stopped in Step 215 (reference S44), and thus the scan drive motor 55 is stopped (reference S45). This stopping operation is controlled by counting pulse signals for operating the scan drive motor 55, for example. Then, in Step 216, the completion of the reading scan of the line sensor 44 is confirmed similar to Step 212, and the reading scan is stopped in Step 217. Namely, even when the loop of Steps 212 through 214 ends without executing Step 213, the reading scan of the line sensor 44 is completed in Step 217.

In Step 218, it is determined whether a reading operation for all of the horizontal scanning lines has been completed, by counting the value of a number counter which has been counted in Step 213, for example. The number of all of the horizontal scanning lines may be 2000, for example. When the reading operation of all of the horizontal scanning lines has not been completed, the process returns to Step 208, and the operations described above are executed again.

Thus, in this embodiment, the line sensor 44 is repeatedly moved and then stopped after a predetermined time and by a predetermined amount, by the sub-scanning mechanism 50, so that the line sensor 44 moves on the imaging plane of the scanner optical system 43 to scan the image, and the pixel signals are read out while the line sensor 44 moves.

When all of the horizontal scanning lines have been read out (reference S50), the process goes from Step 218 to Step 219. In Step 219, the drive power source of the line sensor 44 is turned OFF (reference S51), and in Step 220, the light source 42 is turned OFF (reference S52). In Step 221, the shutter 22 is closed (reference S53), and in Step 222, a scanner drive signal for operating the scan drive motor 55 in the rearward direction is outputted (reference S54), and thus, the moving member 52 starts to descend (reference S55).

During the descending movement of the moving member 52, when it is confirmed in Step 223 that the line sensor 44 has returned to the initial position thereof, the output of the scanner drive signal is stopped in Step 224 (reference S56), so that the scan drive motor 55 is stopped (reference S57). Note that the operation of Step 223 is performed based on a signal outputted by an operation in which a part of the moving member 52 traverses a photo-interrupter (not shown).

As describe above, according to the embodiment, an object image is developed on the electric charge keeping medium (the dispersion type liquid crystal display) 32 of the electro-developing recording medium 30, by handling the release switch 14. The object image developed on the dispersion type liquid crystal display is sensed by sub-scanning the line sensor 44, and recorded on a recording medium, such as an IC memory card, through the image recording device 67. The image signal sensing system constructed by the combination of the electro-developing recording medium 30 and the line sensor 44 is smaller and has a lower cost than a two-dimensional sensor (an area sensor) made with CCDs, and therefore, is highly advantageous especially when obtaining a high definition image. Further, since an image is kept in the electric charge keeping medium 32, a reading operation of the image by the line sensor 44 can be carried out slowly, and a circuit for processing the read-out image signal need not be complex.

Figure 9:
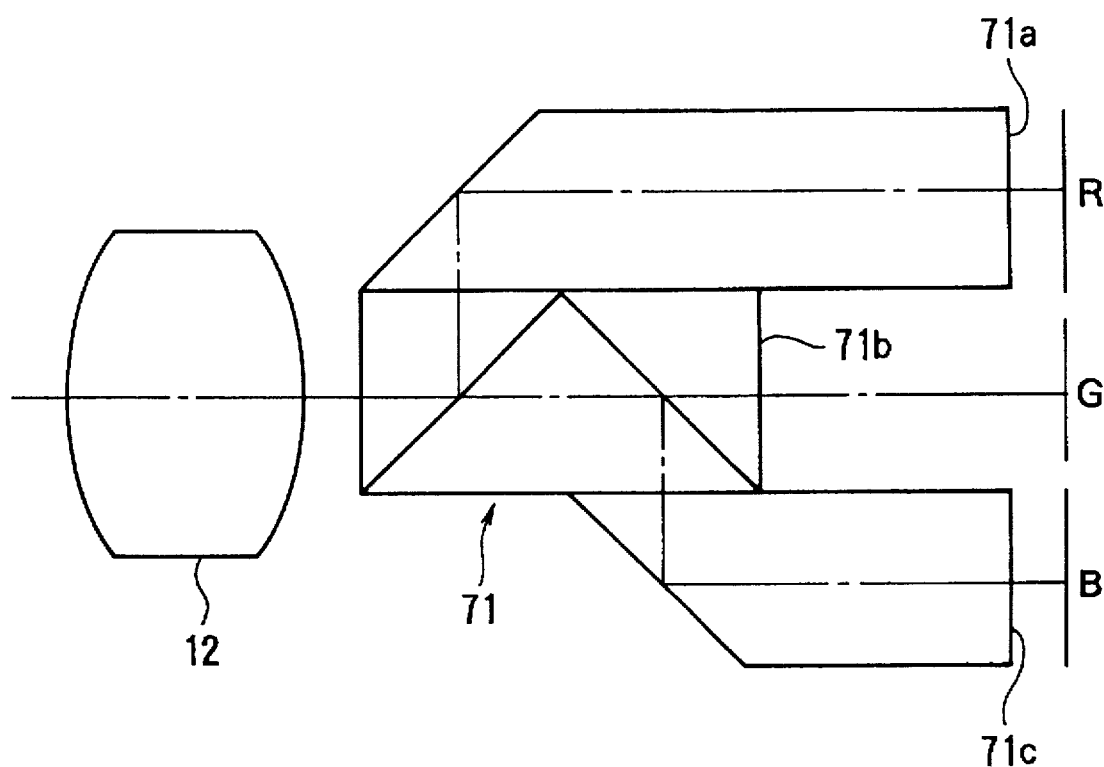
FIG. 9 is a plane view showing an optical system used for obtaining a color image using the electro-developing recording medium.

FIG. 9 shows an example of an optical system used for obtaining a color image using the electro-developing recording medium 30. This optical system has a dichroic prism 71 disposed behind the photographing optical system 12. Namely, a light beam passing through the photographing optical system 12 is divided into R (red), G (green) and B (blue) components by the dichroic prism 71 and is outputted from three emergent planes 71a, 71b and 71c. Three electro-developing recording mediums are disposed in such a manner that the electro-developing recording mediums face the emergent planes 71a, 71b and 71c, respectively. The image signals read out from the electro-developing recording mediums are processed by the image processing circuit 63 (FIG. 2), and are outputted to the image recording device 67 or the output terminal 71. There is, for example, only one line sensor 44, and it moves along the three emergent planes 71a, 71b and 71c to sub-scan the image.

Note that the electro-developing recording medium 30 is not restricted to the structure described above, and may be any other structure by which an image is electronically developed.

The present invention is not restricted to a single-lens reflex camera described above, but can be applied to a lens shutter camera. Note that, when the present invention is applied to the lens shutter camera, the shutter 22 need not be opened again when the scan drive motor 55 is operated, as in the above described embodiment.

A single lens, a micro-lens array, a rod lens array and so on may be used for the scanner optical system 43.

Further, the recording medium mounted in the image recording device 67 may be a magnetic recording medium, such as a hard disk, or a magnet-optic recording medium, such as a magneto-optic disc.

The line sensor 44 may be disposed in such a manner that a light beam reflected by the electro-developing recording medium 30 is sensed.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 6-275575 (filed on Oct. 14, 1994) which is expressly incorporated herein, by reference, in its entirety.

We claim:

1. An image signal generating device, comprising:

a first optical system;

an electro-developing recording medium that electronically develops an image formed by said first optical system;

a shutter positioned between said first optical system and said electro-developing recording medium, said shutter being selectively openable;

a light source that illuminates said electro-developing recording medium, said light source being selectively positioned between said first optical system and said shutter;

a second optical system disposed on an optical path of a light beam generated by illuminating said electro-developing recording medium;

a sensor that is moved to an imaging plane on which an image is formed by said second optical system, said sensor generating a pixel signal in accordance with said formed image;

a sub-scanning mechanism that moves said sensor on said imaging plane to sense said image; and a reader that reads out said pixel signal from said sensor, wherein a light beam emitted by said light source passes through said shutter, when said shutter is opened, to illuminate said electro-developing recording medium to develop said image formed by said first optical system, said sensor being moved, by said sub-scanning mechanism, to sense said image developed on said electro-developing recording medium after said shutter is opened.

2. An image signal generating device according to claim 1, wherein said electro-developing recording medium comprises an electrostatic information recording medium that generates an electric charge in accordance with an image formed thereon, and an electric charge keeping medium which generates a visible image in accordance with said electric charge and which keeps said visible image.

3. An image signal generating device according to claim 1, wherein said electric charge keeping medium comprises a dispersion type liquid crystal display.

4. An image signal generating device according to claim 1, wherein said light source and said sensor are provided in said sub-scanning mechanism, so that said light source is moved along a front surface of said electro-developing recording medium and said sensor is moved along a rear surface of said electro-developing recording medium.

5. An image signal generating device according to claim 1, wherein said second optical system is supported by said sub-scanning mechanism, and is positioned between said electro-developing recording medium and said sensor.

6. An image signal generating device according to claim 1, wherein said second optical system is disposed on said optical path of said light beam which passes through said electro-developing recording medium.

7. An image signal generating device according to claim 1, wherein said sensor comprises a line sensor.

8. An image signal generating device according to claim 7, wherein said line sensor is moved by said sub-scanning mechanism in a direction different from a longitudinal direction of said line sensor.

9. An image signal generating device according to claim 8, wherein said line sensor is moved by said sub-scanning mechanism in a direction perpendicular to said longitudinal direction.

10. An image signal generating device according to claim 7, wherein said line sensor repeatedly moves and then stops after a predetermined time and by a predetermined amount, to scan said image.

11. An image signal generating device according to claim 1, wherein said reader reads out said pixel signal while said sensor moves.

12. An image signal generating device according to claim 1, further comprising a release switch, an image being developed on said electro-developing recording medium by actuating said release switch.

13. An image signal generating device according to claim 1, further comprising a starter that starts said sub-scanning mechanism to move said sensor.

14. An image signal generating device according to claim 1, wherein said sub-scanning mechanism has a moving member including first and second leg portions, said light source being attached to one of said first or second leg portions, said sensor and said second optical system being attached to the other of said first or second leg portions.

15. An image signal generating device, comprising:

a first optical system;

an electro-developing recording medium that electronically develops an image formed by said first optical system;

a shutter positioned between said first optical system and said electro-developing recording medium, said shutter being selectively openable;

a light source that illuminates said electro-developing recording medium, said light source being selectively positioned between said first optical system and said shutter;

a second optical system disposed on an optical path of a light beam passing through said electro-developing recording medium; and a line sensor that moves in an imaging plane on which an image is formed by said second optical system, and outputs a pixel signal in accordance with said image, wherein a light beam emitted by said light source passes through said shutter when said shutter is opened to illuminate said electro-developing recording medium to develop said image formed by said first optical system, said line sensor being moved to sense said image developed on said electro-developing recording medium after said shutter is opened.

16. An image signal generating device according to claim 15, further comprising a reader that reads out said pixel signal from said line sensor.

17. A camera in which an electro-developing recording medium is mounted, said camera comprising:

a photographing optical system that forms an object image onto said electro-developing recording medium;

an exposure controller that controls an exposure of said electro-developing recording medium;

a developing controller that outputs a recording medium activating signal by which said object image is formed in said electro-developing recording medium;

a first commander that commands a start of operations of said exposure controller and said developing controller;

a reading device that reads optical image information formed on said electro-developing recording medium which corresponds to said object image, for converting said optical image information to electronic information, and for outputting said electronic information; and a second commander that commands said reading device to start predetermined operations, wherein said exposure controller comprises a shutter, positioned between said photographing optical system and said electro-developing recording medium, that selectively enables a light beam associated with said object image to impinge said electro-developing recording medium to form said object image onto said electro-developing recording medium, said reading device having a light source that illuminates said electro-developing recording medium after said object image is formed in said electro-developing recording medium, said light source being positioned between said photographing optical system and said shutter.

18. A camera according to claim 17, wherein said first commander comprises a first operation member, and operations of said exposure controller and said developing controller are started when said first operation member is operated.

19. A camera according to claim 17, wherein said first commander starts an operation of said developing controller prior to an operation of said exposure controller.

20. A camera according to claim 17, wherein said first commander starts an operation of said developing controller and an operation of said exposure controller substantially at the same time.

21. A camera according to claim 17, wherein said second commander comprises a second operation member, operations of said reading means being started when said second operation member is operated.

22. A camera according to claim 17, wherein said second commander comprises a displacing device that displaces said reading device in such a manner that said reading device does not occupy a position in an optical path of said photographing optical system when said reading device does not perform a reading operation.

23. A camera according to claim 17, wherein said photographing optical system comprises a photographing lens system and a dichroic optical system, said electro-developing recording medium being positioned at a portion where images in color obtained through said dichroic optical systems are formed.

24. A camera, comprising:

an electro-developing recording medium;

a photographing optical system that forms an optical image onto said electro-developing recording medium;

a shutter disposed between said photographing optical system and said electro-developing recording medium;

a light source that illuminates said electro-developing recording medium, said light source being selectively disposed between said photographing optical system and said shutter;

a photoelectric conversion device that photoelectrically converts an optical image signal to an electronic signal and outputting said electronic signal, said photoelectric conversion device comprising a line sensor;

a reading optical system that forms said optical image formed on said electro-developing recording medium onto a light receiving surface of said photoelectric conversion device; and an image signal generator that generates an image signal corresponding to said optical image formed on said electro-developing recording medium based on said electronic signal outputted from said photoelectric conversion means, said image signal generator performing a main scanning operation in which a main scan is carried out along a longitudinal direction of said line sensor, said image signal generator performing a sub-scanning operation in which said line sensor is moved in a direction different from said longitudinal direction along said electro-developing recording medium, whereby a two dimensional optical image on said electro-developing recording medium is read out to generate an image signal corresponding to said optical image, said image signal generator having a moving member movable in a direction different from said longitudinal direction of said line sensor and along said electro-developing recording medium, said line sensor, said reading optical system and said light source being attached to said moving member in such a manner that said electro-developing recording medium is located between said line sensor and said reading optical system.

25. A camera according to claim 24, further comprising an output terminal that outputs said image signal generated by said image signal generator to outside said camera.

* * * * *